United States Patent
Arkoff et al.

(10) Patent No.: US 12,445,308 B1
(45) Date of Patent: Oct. 14, 2025

(54) AI-READY STATIONARY IV POLE SYSTEM FOR REAL-TIME MEDICAL DEVICE INTEGRATION, ROLE-BASED ALERT RENDERING, AND GOVERNANCE-COMPLIANT CLINICAL COMMUNICATION

(71) Applicant: OneSource Solutions International, Inc., Sudbury, MA (US)

(72) Inventors: Harold Arkoff, Sudbury, MA (US); Vedran Jukic, Trieste (IT)

(73) Assignee: OneSource Soultions International, Inc., Sudbury, MA (US)

( * ) Notice: Subject to any disclaimer, the term of this patent is extended or adjusted under 35 U.S.C. 154(b) by 0 days.

(21) Appl. No.: 19/229,627

(22) Filed: Jun. 5, 2025

Related U.S. Application Data

(63) Continuation-in-part of application No. 19/000,461, filed on Dec. 23, 2024, now Pat. No. 12,337,143.

(51) Int. Cl.
*H04L 9/32* (2006.01)

(52) U.S. Cl.
CPC .......... *H04L 9/3247* (2013.01); *H04L 9/3239* (2013.01)

(58) Field of Classification Search
None
See application file for complete search history.

(56) References Cited

U.S. PATENT DOCUMENTS

| | | | |
|---|---|---|---|
| 2021/0056547 A1* | 2/2021 | Monica | H04L 9/3247 |
| 2023/0353357 A1* | 11/2023 | Chan | H04L 9/002 |
| 2025/0165957 A1* | 5/2025 | Sprague | H04L 9/50 |

* cited by examiner

*Primary Examiner* — Manuel A Mendez
(74) *Attorney, Agent, or Firm* — IP Consulting Group; Michael Razavi; Alfred F Hoyte, Jr.

(57) ABSTRACT

An IV pole system for AI-ready clinical data preparation is disclosed. The system includes a data acquisition module configured to collect physiological telemetry and contextual metadata, a governance enforcement engine to apply medical data governance policies, a packetization module to generate semantically structured AI-ready data, a fallback execution engine to maintain lawful classification and rendering during inference engine unavailability, and a cryptographic module to digitally sign and record classification results in a tamper-evident audit ledger. The structured data complies with applicable regulatory standards and is configured for lawful downstream interpretation by artificial intelligence models. The system can be fixed or mobile, interfaces with medical devices to collect multimodal telemetry, and dynamically applies governance policies based on clinician credentials, location, and task-specific permissions. Additionally, the system supports dynamic policy updates and cryptographic audit logging to ensure traceability and compliance.

20 Claims, 9 Drawing Sheets

AI-READY STATIONARY IV POLE SYSTEM FOR REAL-TIME MEDICAL DEVICE INTEGRATION, ROLE-BASED ALERT RENDERING, AND GOVERNANCE-COMPLIANT CLINICAL COMMUNICATION

CROSS-REFERENCE TO RELATED APPLICATIONS

This application is a continuation-in-part of U.S. patent application Ser. No. 19/000,461, titled "Smart IV Pole for Hospital Policy Execution and Digital Provenance," now allowed. The present application further incorporates by reference the entirety of U.S. Pat. No. 11,693,990 B1 and U.S. Pat. No. 12,001,464 B1. These prior patents establish the symbolic Medical Data Governance (MDG) and compliance-rendering framework upon which the present invention is built. The disclosures of these related applications and patents are fully incorporated herein by reference for all purposes.

FIELD OF TECHNOLOGY

The present invention pertains to the field of clinical informatics infrastructure. More particularly, it relates to a fixed or mobile, patient-adjacent platform, such as an IV pole integrated with hospital equipment, designed to acquire, classify, and structure clinical telemetry data for compliant downstream use by artificial intelligence (AI) systems. The invention facilitates the enforcement of Medical Data Governance (MDG) policies, enables the generation of symbolic metadata, supports fallback execution mechanisms, and ensures cryptographic auditability. Collectively, these capabilities establish a foundational framework for AI-readiness within regulated healthcare environments.

BACKGROUND

Artificial intelligence (AI) is increasingly being adopted in clinical workflows to support decision-making, risk stratification, and predictive analytics at the point of care. However, the implementation of AI in regulated healthcare environments is subject to growing scrutiny from institutional stakeholders and regulatory authorities. Recent standards, including the U.S. Food and Drug Administration's Good Machine Learning Practice (GMLP), guidance from the Office of the National Coordinator for Health Information Technology (ONC), and frameworks such as Structured and Explainable AI for Decision Integrity (SADI), emphasize the need for clinical data to be explainable, traceable, and governed by enforceable policies from the moment of acquisition.

Conventional IV poles and bedside telemetry systems are not designed to meet these requirements. These systems typically capture raw physiological data and transmit it downstream with little or no symbolic metadata, semantic labeling, or role-based filtering. They cannot cryptographically demonstrate that data has been structured or governed by institutional policy at the point of origin. As a result, downstream data provenance cannot be reliably established, limiting the ability to support legally defensible, AI-assisted clinical decision-making and introducing potential safety and liability concerns.

Furthermore, current systems are not equipped with autonomous, policy-driven fallback mechanisms to ensure continuous operation in the event of network disruptions or inference engine failures. In such scenarios, alerts may be delayed, omitted, or rendered without proper policy filtering or auditability, undermining both clinician trust and regulatory compliance. This can turn out to be a serious issue.

Accordingly, there is a need for a patient-adjacent infrastructure, such as an IV pole integrated with policy enforcement capabilities, that can natively structure, label, and classify clinical telemetry by Medical Data Governance (MDG) policies and without requiring any dependency on any additional system(s). Such a system should also support cryptographic audit logging, dynamic role-based filtering, and autonomous fallback logic, ensuring that data used by AI systems remains lawful, explainable, and traceable from its point of origin. This disclosure addresses the underlying technical and compliance challenges associated with integrating AI into clinical environments.

BRIEF SUMMARY OF THE DISCLOSURE

The adoption of artificial intelligence (AI) in clinical workflows is hindered by the inability of existing bedside systems, such as traditional IV poles, to meet the requirements for data explainability, traceability, and compliance with regulatory standards. Such systems typically transmit raw physiological data without incorporating symbolic metadata, semantic labeling, or role-based filtering, making it difficult to ensure data integrity and compliance. Additionally, such systems lack mechanisms to cryptographically attest to data provenance or enforce institutional policies at the point of origin. Operational disruptions, such as connectivity loss or inference engine unavailability, further exacerbate these challenges, leading to delays, data loss, or non-compliant outputs. These deficiencies expose healthcare institutions to risks related to patient safety, regulatory non-compliance, and legal liability.

The present invention addresses these challenges by introducing an IV pole system that integrates advanced modules for data acquisition, governance enforcement, packetization, fallback execution, and cryptographic audit logging. This system ensures that clinical telemetry is structured, policy-constrained, and AI-ready at the point of origin, enabling lawful downstream use by AI models. The invention provides a robust solution to the technical and legal challenges faced by hospitals seeking to integrate AI into their clinical environments.

Systems and/or methods are provided for governance-compliant clinical communication, substantially as shown in and/or described in connection with at least one of the figures, as set forth more completely in the claims.

According to an embodiment of the disclosure, an IV pole system for AI-ready clinical data preparation includes at least one data acquisition module integrated into the IV pole. The data acquisition module is configured to collect physiological telemetry and contextual metadata from a patient environment. The IV pole system includes at least one governance enforcement engine housed within the IV pole. The governance enforcement engine is configured to apply a medical data governance policy to the collected physiological telemetry and contextual metadata. The application of the medical data governance policy produces structured symbolic classifications, alert categories, and credential-bound role metadata. The IV pole system includes at least one packetization module integrated into the IV pole. The packetization module is configured to generate semantically structured data in an AI-ready format. Each semantically structured data packet includes at least one timestamp, symbolic tag, alert classification, role constraint, and policy identifier. The IV pole system includes at least one fallback execution engine integrated into the IV pole. The fallback execution engine is configured to maintain lawful classification and rendering when an external inference engine is unavailable. The IV pole system includes at least one cryptographic module integrated into the IV pole. The cryptographic module is configured to digitally sign and record each classification result into a tamper-evident audit ledger. The structured data is formatted to comply with applicable regulatory standards. The structured data is configured for lawful downstream interpretation by artificial intelligence models.

According to an embodiment of the disclosure, the IV pole system is configured to be either fixed or mobile. The fixed or mobile configuration allows deployment of the IV pole system in various patient care environments.

According to an embodiment of the disclosure, the IV pole system is configured such that symbolic tags include representations of at least one of clinical urgency, classification certainty, and permissible role-based actions. The symbolic tags are selected from a constrained vocabulary defined by a rendering grammar. The symbolic tags are mapped to at least one machine-readable or human-interpretable output.

According to an embodiment of the disclosure, the IV pole system includes a fallback execution engine configured to use symbolic co-occurrence grammars and priority rule-tree traversal. The symbolic co-occurrence grammars and priority rule-tree traversal enable lawful alert rendering in the absence of live inference output.

According to an embodiment of the disclosure, the IV pole system is configured such that rendered outputs are filtered and gated based on clinician role, task authority, and current unit assignment. The clinician's role, task authority, and current unit assignment are defined by the medical data governance policy.

According to an embodiment of the disclosure, the IV pole system includes an audit ledger including a cryptographically chained structure. The cryptographically chained structure records at least one of the patient identity, classification outcome, rendering recipient, timestamp, and digital signature hash for each event. The audit logs are exportable for automated compliance review.

According to an embodiment of the disclosure, the IV pole system further includes a dynamic policy update mechanism integrated into the IV pole. The dynamic policy update mechanism is configured to receive, validate, and attest updates to at least one governance ruleset. The dynamic policy update mechanism maintains cryptographic audit traceability for policy changes.

According to an embodiment of the disclosure, the IV pole system includes a data acquisition module configured to interface with at least one medical device.

The at least one medical device includes infusion pumps, ECG monitors, or pulse oximeters. The data acquisition module is configured to collect multimodal telemetry from the at least one medical device.

According to an embodiment of the disclosure, the packetization module is configured to generate AI-ready data packets. Each AI-ready data packet includes role-permission tokens and policy identifiers for downstream artificial intelligence processing.

According to an embodiment of the disclosure, the governance enforcement engine is configured to dynamically apply medical data governance policies. The dynamic application of medical data governance policies is based on clinician credentials, location, and task-specific permissions.

According to an embodiment of the disclosure, a method for preparing AI-ready clinical data using an IV pole system includes collecting physiological telemetry and contextual metadata from a patient environment using a data acquisition module integrated into the IV pole. The method includes applying a medical data governance policy to the collected physiological telemetry and contextual metadata using a governance enforcement engine housed within the IV pole. The application of the medical data governance policy produces structured symbolic classifications, alert categories, and credential-bound role metadata. The method includes generating semantically structured data in an AI-ready format. Each semantically structured data includes at least one timestamp, symbolic tag, alert classification, role constraint, and policy identifier. The method includes maintaining lawful classification and rendering using a fallback execution engine integrated into the IV pole when an external inference engine is unavailable. The method includes digitally signing and recording each classification result into a tamper-evident audit ledger using a cryptographic module integrated into the IV pole. The method includes formatting the structured data to comply with applicable regulatory standards. The structured data is prepared for lawful downstream interpretation by artificial intelligence models.

According to an embodiment of the disclosure, the method is implemented in an IV pole configured to be either fixed or mobile. The fixed or mobile configuration allows deployment of the IV pole in various patient care environments.

According to an embodiment of the disclosure, the method further includes dynamically updating medical data governance policies. The dynamically updated medical data governance policies are applied to subsequent data classifications.

According to an embodiment of the disclosure, the method is configured such that the symbolic classifications include representations of clinical urgency, classification certainty, and permissible role-based actions.

According to an embodiment of the disclosure, the method further includes filtering and gating rendered outputs. The rendered outputs are filtered and gated based on clinician role, task authority, and current unit assignment.

According to an embodiment of the disclosure, the method further includes exporting cryptographically signed audit logs. The exported audit logs are used for compliance review by external regulatory bodies.

According to an embodiment of the disclosure, the method further includes using symbolic co-occurrence grammars and priority rule-tree traversal. The symbolic co-occurrence grammars and priority rule-tree traversal are used by the fallback execution engine to maintain lawful alert rendering in the absence of live inference output.

According to an embodiment of the disclosure, the method further includes interfacing the data acquisition module with at least one medical device. The at least one medical device includes infusion pumps, ECG monitors, or pulse oximeters. The data acquisition module is configured to collect multimodal telemetry from the at least one medical device.

According to an embodiment of the disclosure, a computer program product includes a non-transitory computer-readable medium having instructions stored thereon.

The instructions, when executed by a processor integrated into an IV pole system, cause the processor to perform a method for preparing AI-ready clinical data. The method includes collecting physiological telemetry and contextual metadata from a patient environment using a data acquisition module integrated into the IV pole. The method includes applying a medical data governance policy to the collected data, producing structured symbolic classifications, alert categories, and credential-bound role metadata. The method includes generating semantically structured data in an AI-ready format. Each semantically structured data includes at least one timestamp, symbolic tag, alert classification, role constraint, and policy identifier. The method includes maintaining lawful classification and rendering when an external inference engine is unavailable. The method includes digitally signing and recording each classification result into a tamper-evident audit ledger. The method includes formatting the structured data to comply with applicable regulatory standards. The structured data is prepared for lawful downstream interpretation by artificial intelligence models.

According to an embodiment of the disclosure, the computer program product includes instructions that further cause the processor to dynamically update medical data governance policies. The dynamically updated medical data governance policies are applied to subsequent data classifications.

The present disclosure offers a number of advantages that facilitate the lawful, explainable, and traceable integration of artificial intelligence into clinical workflows. By structuring and constraining clinical telemetry at the point of origin, the disclosed system enables compliance with emerging regulatory frameworks, including, but not limited to, the U.S. Food and Drug Administration's Good Machine Learning Practice (GMLP), Structured and Explainable AI for Decision Integrity (SADI), and guidance issued by the Office of the National Coordinator for Health Information Technology (ONC) or by any other authority around the world. This approach mitigates legal exposure and reduces compliance-related risks for healthcare institutions.

The inclusion of cryptographic audit logging enhances data provenance and traceability by generating tamper-evident, forensic-quality records of classification and alerting events. These records support institutional accountability and provide a legally defensible audit trail in the context of regulatory review or litigation.

Operational continuity is further supported by a policy-driven fallback execution engine that maintains compliant classification and alerting functionality during network disruptions or the unavailability of the inference engine. This resilience ensures adherence to institutional policies and helps sustain continuity of care in constrained environments.

Additionally, the system's modular architecture enables seamless integration with existing hospital infrastructure and supports scalability across various clinical domains. As a result, the disclosed platform serves as a foundational layer for AI readiness in modern healthcare settings, enabling the safe, transparent, and efficient deployment of AI-based clinical decision support technologies.

DETAILED DESCRIPTION OF THE DISCLOSURE

Figure 1:
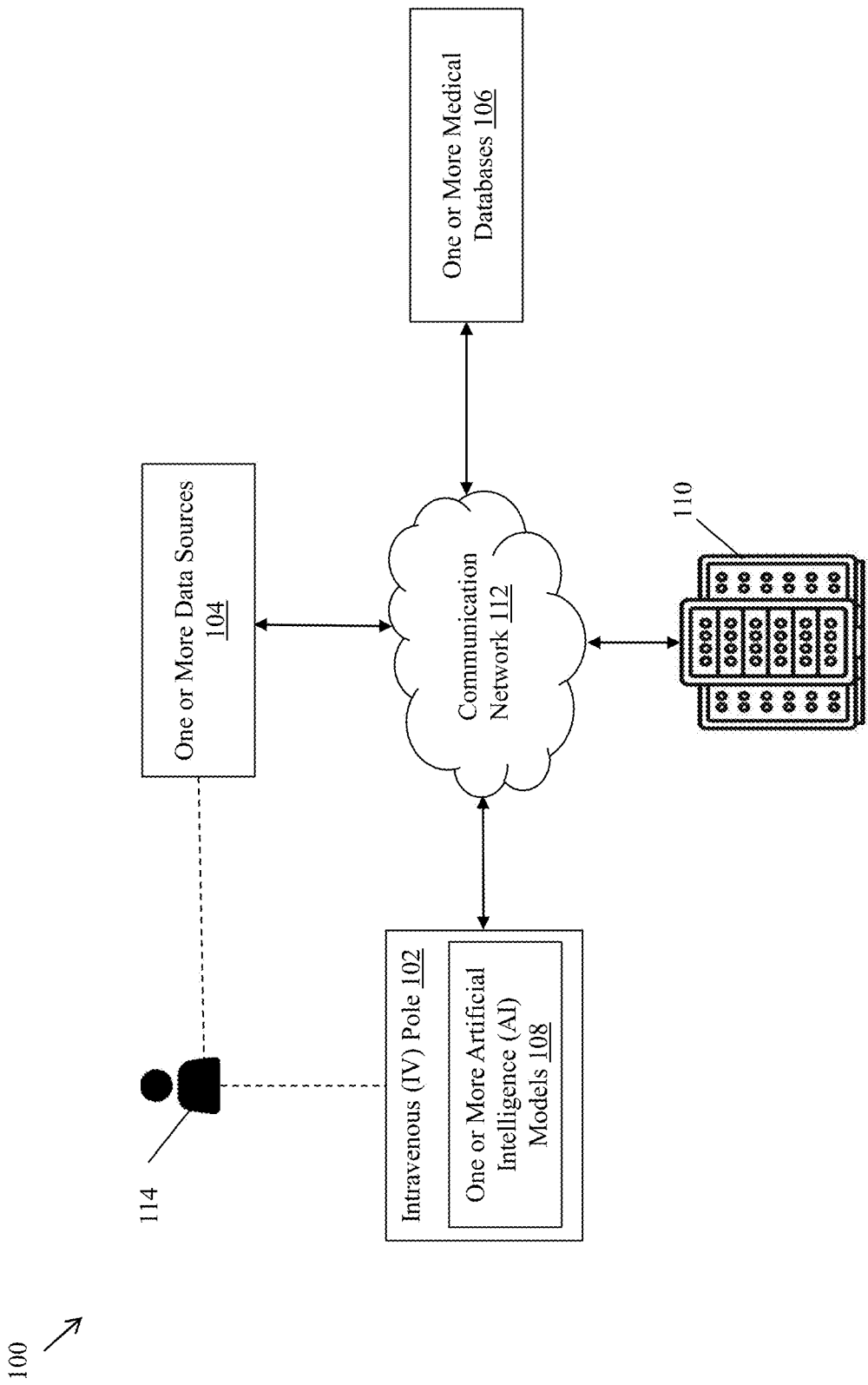
FIG. 1 is a block diagram that illustrates an exemplary environment for the governance-compliant clinical communication, in accordance with an exemplary embodiment of the disclosure.

Various aspects of the disclosure may be found in a system and method for an AI-ready IV pole for clinical data preparation and governance-compliant clinical communication.

The present disclosure builds upon the subject matter previously described in U.S. patent application Ser. No. 19/000,461, titled "Smart IV Pole for Hospital Policy Execution and Digital Provenance," hereinafter referred to as Application 1. In the Application 1, a mobile IV pole system was disclosed that included embedded telemetry acquisition components and logic configured to enforce hospital-defined classification policies. The mobile IV pole further supported alert generation and real-time rendering, with role-based filtering to control alert visibility based on clinician credentials. Secure transmission of alert payloads to external hospital systems was also provided through embedded networking modules.

The system described herein retains the core telemetry acquisition framework and role-sensitive rendering logic of the IV pole described in Application 1, while introducing substantial enhancements in both technical scope and legal utility. In particular, the present disclosure introduces symbolic metadata generation configured to perform semantic tagging of telemetry events using constrained vocabularies in accordance with Medical Device Governance (MDG)

policies. The symbolic tags are associated with clinical urgency, classification certainty, and credential-bound action permissions.

In addition, the present disclosure introduces an AI-ready packetization module configured to format telemetry data and corresponding classification outputs into structured, machine-readable packets. In various embodiments, such machine-readable packets include at least a timestamp, one or more symbolic tags, a role-permission token, an MDG policy identifier, and a cryptographic signature hash, as described below. The machine-readable packets (also referred to as AI-ready packets) enable downstream lawful ingestion by artificial intelligence agents and support explainable and auditable clinical decision support operations.

The disclosed system addresses the challenges in clinical informatics by implementing a hardware-embedded infrastructure configured to enforce policy-constrained, role-specific symbolic classification at the point of care. These capabilities transform the IV pole from a passive data collection device into an active compliance-executing node, capable of preparing structured, lawful, and traceable inputs for AI systems.

In certain embodiments, the system (or the IV pole) further includes a fallback execution engine configured to continue lawful classification and policy-bound rendering during network outages or even during the unavailability of the inference engine. This fallback execution engine ensures uninterrupted alert delivery and policy compliance in degraded operating conditions. Furthermore, the system includes a cryptographic audit ledger, which stores classification results, symbolic alerts, rendering decisions, and policy identifiers in a chained, tamper-evident structure. These features collectively support forensic traceability and institutional accountability.

Through these enhancements, the IV pole is reconfigured as an infrastructure-grade clinical node, positioned at the point of care and integrated with hospital telemetry sources and secure networks. In combination, the disclosed modules of the IV pole support real-time symbolic classification, lawful data transformation, and auditable alert generation in alignment with regulatory frameworks including, but not limited to, the FDA's Good Machine Learning Practice (GMLP), the Structured and Explainable AI for Decision Integrity (SADI) framework, and guidance from the Office of the National Coordinator for Health Information Technology (ONC).

In various embodiments, the disclosed system is implemented as a patient-adjacent fixture configured to acquire, classify, semantically tag, and securely transmit clinical telemetry in a lawful and explainable manner. By enabling structured data preparation and cryptographic audit at the point of origin, the system serves as a foundational infrastructure for compliant AI adoption in clinical environments.

DEFINITONS: As used herein, the following terms shall have the meanings set forth below. These definitions are provided to clarify the scope and application of the disclosed subject matter and are not intended to be limiting. Where applicable, illustrative examples are provided for clarity.

AI-Ready: The term "AI-ready" refers to data or data structures that have been formatted, constrained, and labeled in a manner that enables their safe, effective, and legally compliant use by downstream artificial intelligence (AI) systems. AI-ready data is structured according to policy-enforced schemas and includes, but is not limited to: (i) semantically enriched labels derived from clinical telemetry and context, (ii) time-anchored metadata, (iii) credential-specific access constraints, (iv) audit logging markers, and (v) fallback interpretability mechanisms. In one example, AI-ready formats comply with applicable standards such as Good Machine Learning Practice (GMLP), Structured and Explainable AI for Decision Integrity (SADI), and guidelines issued by the Office of the National Coordinator for Health Information Technology (ONC). Such formats may include structured event packets comprising timestamps, symbolic classifications, and permission tokens suitable for both automated inference and human review.

Symbolic Metadata: The term "symbolic metadata" refers to metadata representations that abstract clinical information into constrained symbolic formats. These formats are machine-readable and designed to encode attributes such as risk classification, alert priority, task relevance, or intervention urgency using standardized tokens or codes drawn from a limited visual or semantic vocabulary. Symbolic metadata facilitates rule-based decision logic, policy-based filtering, role-specific gating, and fallback rendering in the event of AI inference failure. By way of example, a symbolic token such as "ALERT HIGH RISK" may correspond to a red visual indicator on a user interface, and simultaneously trigger a high-priority escalation protocol within clinical systems.

Lawful Output: The term "lawful output" refers to any classification, alert, notification, or rendered result that has been generated and displayed or transmitted in compliance with a predetermined medical data governance (MDG) policy framework. Lawfulness in this context is determined by evaluating the output against policy constraints using a credential-bound rule tree or equivalent enforcement logic. Outputs that do not satisfy these constraints—such as being accessible by unauthorized personnel—are considered non-lawful and are either suppressed or modified accordingly. Lawful output ensures regulatory compliance, auditability, and operational safety in clinical environments.

Role-Permission Matrix: The term "role-permission matrix" refers to a dynamic authorization framework that maps predefined clinical roles—such as registered nurse (RN), physician (MD), or licensed practical nurse (LPN)—to specific permission scopes governing classification visibility, alert rendering, intervention escalation, or documentation privileges. The matrix may be implemented using a policy tree or equivalent rule-encoding structure and is invoked in real time based on contextual attributes, including clinician identity, task assignment, and unit location. For example, a certain alert may be visible only to users with emergency response credentials during a particular shift period.

Fallback Logic: The term "fallback logic" refers to an autonomous processing mechanism designed to preserve system operability and compliance in scenarios where external inference engines are unavailable or non-functional. Fallback logic operates by activating cached symbolic grammars, rule-tree traversal algorithms, and pre-validated classification schemas to maintain lawful alert generation and rendering. This logic ensures continuity of clinical oversight, particularly in high-acuity environments, even in the presence of network connectivity disruptions or computational failure. For example, if a cloud-based AI inference module becomes unreachable, the system may rely on locally stored rule sets to classify a patient's deteriorating vital signs.

Symbolic Co-occurrence Grammars: The fallback execution engine implements symbolic co-occurrence grammars to ensure lawful and meaningful alert classifications even when real-time data from external inference engines are unavailable. These grammars comprise a structured vocabulary of permissible symbolic tags representing clinical urgency, alert categories, and permissible clinician actions. Each symbolic classification is derived through grammatical rules that validate the logical co-occurrence of clinical conditions, observed physiological data, and contextually relevant metadata. By enforcing these grammars, the fallback engine ensures consistency, regulatory compliance, and meaningfulness of alerts, reducing ambiguity and enhancing clinical usability.

Priority Rule-trees: The fallback execution engine further utilizes priority rule-trees to manage and prioritize symbolic tag selection and rendering decisions under constrained or degraded system conditions. These trees organize alert categories and permissible actions into hierarchical priority levels, each defined by clinical urgency, contextual parameters, and regulatory mandates. When external inference support is lost or compromised, the rule-trees are traversed in priority order, ensuring that the highest-priority lawful alerts are generated first. This structured approach ensures timely clinical responses, preserves patient safety, and maintains compliance with applicable regulatory standards, even under reduced operational capability.

Good Machine Learning Practice (GMLP): The term "Good Machine Learning Practice (GMLP)" refers to a set of technical and procedural guidelines, as promulgated by regulatory bodies such as the U.S. Food and Drug Administration (FDA), aimed at ensuring the safety, performance, and traceability of AI models deployed in clinical contexts. GMLP encompasses practices such as dataset curation, model validation, auditability of outcomes, and structural transparency of inputs and outputs. In particular, GMLP-compliant systems must be capable of structuring input data with semantic tags, timestamps, user credentials, and role filters to enable explainable AI inference and regulatory oversight.

Structured and Explainable AI for Decision Integrity (SADI): The term "Structured and Explainable AI for Decision Integrity (SADI)" refers to an architectural and procedural framework for ensuring that clinical AI systems operate in a transparent, auditable, and context-sensitive manner. A SADI-compliant system utilizes constrained symbolic vocabularies, visual grammars, and governance rules to structure and label input data such that downstream decisions are interpretable by both machines and humans. The SADI paradigm supports fallback mechanisms, forensic traceability, and role-specific visibility, enabling institutions to maintain both clinical trust and legal defensibility.

Office of the National Coordinator for Health Information Technology (ONC): The term "Office of the National Coordinator for Health Information Technology (ONC)" refers to the U.S. federal agency responsible for establishing health IT standards, interoperability frameworks, and certification criteria. Key ONC initiatives include the Health IT Certification Program (45 CFR Part 170), the United States Core Data for Interoperability (USCDI), and the Trusted Exchange Framework and Common Agreement (TEFCA). Systems that interface with or utilize ONC-compliant data formats must ensure lawful access, role-based authorization, and structured interoperability with national data exchange networks.

Machine-Readable or Human-Interpretable Output: The term "machine-readable or human-interpretable output" refers to any clinical or telemetry-related data format that is capable of being processed by automated systems (e.g., artificial intelligence modules, clinical decision support software), presented in a form that can be understood and acted upon by human users (e.g., physicians, nurses, technicians), or both. Such outputs may include structured alerts, visual dashboards, auditory warnings, or coded transmissions, and must conform to institutional or regulatory requirements governing display formats, semantic content, and access controls. For instance, an alert labeled with the symbolic tag "ESCALATE_CRITICAL" may trigger both a visible warning on a clinician's console and a machine-readable API transmission to an ICU triage system.

FIG. 1 is a block diagram that illustrates an exemplary environment for the governance-compliant clinical communication, in accordance with an exemplary embodiment of the disclosure. Referring to FIG. 1, there is shown a network environment 100, which may include an intravenous (IV) pole 102, one or more data sources 104, one or more medical databases 106 (or one or more medical databases medical data governance (MDG) databases), one or more artificial intelligence (AI) models 108, a server 110, and a communication network 112. The one or more medical databases 106 may include a first medical database 106A, a second medical database 106B, up to an Nth medical database 106N. With reference to FIG. 1, there is further shown a patient 114.

The IV pole 102 may comprise suitable logic, circuitry, interfaces, and/or code that may be configured to include at least one data acquisition module integrated into the IV pole. The data acquisition module is configured to collect physiological telemetry and contextual metadata from a patient environment. The IV pole system includes at least one governance enforcement engine housed within the IV pole 102. The governance enforcement engine is configured to apply a medical data governance policy associated with the one or more medical databases 106 to the collected physiological telemetry and contextual metadata. The application of the medical data governance policy produces structured symbolic classifications, alert categories, and credential-bound role metadata. The IV pole system includes at least one packetization module integrated into the IV pole 102. The packetization module is configured to generate semantically structured data in an AI-ready format. Each semantically structured data includes at least one timestamp, symbolic tag, alert classification, role constraint, and policy identifier. The IV pole 102 system includes at least one fallback execution engine integrated into the IV pole 102. The fallback execution engine is configured to maintain lawful classification and rendering when an external inference engine is unavailable. The IV pole 102 system includes at least one cryptographic module integrated into the IV pole 102. The cryptographic module is configured to digitally sign and record each classification result into a tamper-evident audit ledger. The structured data is formatted to comply with applicable regulatory standards. The structured data is configured for lawful downstream interpretation by artificial intelligence models.

In an embodiment, the IV pole 102 may enable medical data governance (MDG). The MDG may provide a true source of data that can highlight the schedule of medical treatments and provide tools for rescheduling feedback, contacting and receiving feedback from patients/physicians/healthcare professionals, thus introducing general system flexibility through the use of lean process and six sigma methods. MDG leverages modern communication methods (phone apps, emails, web services, etc.) and easily links patients' physicians, or other healthcare professionals to the scheduled use of medical devices. After unexpected events that may cause a miss in scheduled operations, the MDG may create a backup schedule to pre-emptively fill the gaps and may facilitate healthcare and scheduling professionals to optimize machine time usage. This could create a new marketplace for priority services for those patients who opt for it.

Also, MDG may enable patients/users and or institutions to monetize their vital, medically relevant, patient data collected during the stay inside the healthcare institution, as well as through the extended data collected over some time in multiple stays or spot measurements in healthcare institutions. Patients may be able to establish a relationship with a third party (such as a drug manufacturer, independent drug trial projects, undisclosed trials to the institution) and provide to the third party normalized data collected, organized, and provided by the MDG used by the healthcare institution, and provided to the patient in a different standardized format, even in near real-time. The institution might not be aware of the final user of the patient data. MDG can create additional revenue for the institution by charging for such a service per patient and data processed. MDG can track and trace data usage per patient and assets. MDG, through the export of all specific, validated clinical data and medically relevant data, could create a new data-based economy.

Furthermore, MDG manages patient consent and approval, or notification for the use of the patient data for second opinions, medical treatments, specific research, validation projects, and educational purposes. Specific patient or user data is previously screened based on always updated, public, generic, anonymous metadata (for example: sex, age, days in hospital, normalized data content, and length: heart rate, respiration rate, drugs, etc.). MDG can handle patient consent using modern communication methods (phone apps, emails, web services, etc.) and provide patient consent for their data to be used in a specific research or validation project, with or without compensation. MDG can provide patient consent and access to the data to specific users, like doctors, physicians, and other specific medical professionals. MDG can provide specific code associated with the data, that, based on necessity, can provide, if granted by the user or proxy consent, protected personal identification, family relations, or other protected personal data The MDG may allow for third-party statistical analysis (research) on the whole population dataset, without exporting or providing data to the third party, but rather comparing the result to the legally available consent subset group. A statistically relevant result might indicate a minimal group of a statistically significant subset of data to search for consent and optimize the time for valid and repeatable datasets.

Each of the one or more data sources 104 may correspond to an originator of medical data (such as the patient data) that may be associated with the patient 114. Each of the one or more data sources 104 may be configured to capture the patient data (also referred to as physiological telemetry and contextual metadata) that may be associated with the patient 114 and further transmit the captured patient data (or the physiological telemetry and contextual metadata) to the IV pole 102. In an embodiment, the one or more data sources 104 may include a set of diagnostic medical devices associated with the patient 114, and a set of scanning devices associated with the patient 114. In an alternate embodiment, the one or more data sources 104 may correspond to databases associated with the set of diagnostic medical devices, and the set of scanning devices. In yet another alternate embodiment, the one or more data sources 104 may correspond to a set of wearable devices associated with the patient 114, a set of fluid administration devices associated with the patient 114, and a set of sensors.

Each of the one or more medical databases 106 may correspond to a structured collection of organized information stored electronically in a way that enables easy access, retrieval, and manipulation of medical data. The one or more medical databases 106 may serve as a centralized database where the medical data may be systematically arranged into tables, records, and fields, following a predefined data model. The one or more medical databases 106 may be designed to efficiently manage vast amounts of information, allowing users to perform queries, insert new data, update existing records, and delete information based on specific requirements. In an embodiment, the one or more medical databases 106 may correspond to a storage system associated with the MDG. Examples of different types of the one or more medical databases 106 may include, but are not limited to, a relational database, a non-relational database, a document database, and a graph database.

Each of the one or more AI models 108 may be a computational network or a system of artificial neurons, arranged in a plurality of layers, as nodes. The plurality of layers of each of the one or more AI models 108 may include an input layer, one or more hidden layers, and an output layer. Each layer of the plurality of layers may include one or more nodes (or artificial neurons). Outputs of all nodes in the input layer may be coupled to at least one node of the hidden layer(s). Similarly, inputs of each hidden layer may be coupled to outputs of at least one node in other layers of each of the one or more AI models 108. Outputs of each hidden layer may be coupled to inputs of at least one node in other layers of each of the one or more AI models 108. Node(s) in the final layer may receive inputs from at least one hidden layer to output a result. The number of layers and the number of nodes in each layer may be determined from hyper-parameters of each of the one or more AI models 108. Such hyper-parameters may be set before or while training each of the one or more AI models 108 on a training dataset.

Each node of each of the one or more AI models 108 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of each of the one or more AI models 108. All or some of the nodes of each of the one or more AI models 108 may correspond to the same or a different mathematical function.

In training of each of the one or more AI models 108, one or more parameters of each node of the AI model may be updated based on whether an output of the final layer for a given input (from the training dataset) matches a correct result based on a loss function for each of the one or more AI models 108. The above process may be repeated for the same or a different input until a minima of loss function may be achieved and a training error may be minimized. Several methods for training are known in the art, for example, gradient descent, stochastic gradient descent, batch gradient descent, gradient boosting, meta-heuristics, and the like.

Each AI model of the one or more AI models 108 may include electronic data, such as, for example, a software program, code of the software program, libraries, applications, scripts, or other logic or instructions for execution by a processing device, such as circuitry. Each AI model of the one or more AI models 108 may include code and routines configured to enable a computing device, such as the IV pole 102, to perform one or more operations. Additionally, or alternatively, each AI model of the one or more AI models 108 may be implemented using hardware including a processor, a microprocessor (e.g., to perform or control the performance of one or more operations), general-purpose components such as graphics processing units (GPUs) used for AI, field-programmable gate arrays (FPGAs) used for AI, and AI-specific offerings such as neural processing units (NPUs) and tensor processing units (TPUs), or an application-specific integrated circuit (ASIC). Alternatively, in some embodiments, each AI model of the one or more AI models 108 may be implemented using a combination of hardware and software. Although in FIG. 1, the one or more AI models 108 are shown integrated within the IV pole 102, the disclosure is not so limited. Accordingly, in some embodiments, the one or more AI models 108 may be a separate entity in the IV pole 102, without deviation from the scope of the disclosure. Examples of each AI model of the one or more AI models 108 may include, but are not limited to, a deep neural network (DNN), a convolutional neural network (CNN), a CNN-recurrent neural network (CNN-RNN), R-CNN, Fast R-CNN, Faster R-CNN, an artificial neural network (ANN), (You Only Look Once) YOLO network, a fully connected neural network, Monolithic Large Language Models (LLMs), Mixture of Experts (MoE) Models, Agentic LLMs, Retrieval-Augmented Generation (RAG) Models, Tool-Using LLMs (including function-calling and plugins), Multimodal LLMs, Modular or Compositional LLM Architectures, Distributed LLMs, Federated LLMs, and/or a combination of such networks.

The server 110 may include suitable logic, circuitry, and interfaces, and/or code that may be configured to store the patient data and the medical data. The server 110 may be further configured to store the one or more medical databases 106. The server 110 may be implemented as a cloud server and may execute operations through web applications, cloud applications, HTTP requests, database operations, file transfer, and the like. Other example implementations of the server 110 may include, but are not limited to, a database server, a file server, a web server, a media server, an application server, a mainframe server, or a cloud computing server.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the IV pole 102 as two separate entities. In certain embodiments, the functionalities of the server 110 can be incorporated in its entirety or at least partially in the IV pole 102, without a departure from the scope of the disclosure.

The communication network 112 may include a communication medium through which the IV pole 102, the one or more data sources 104, the one or more medical databases 106, the one or more AI models 108, and the server 110 may communicate with each other. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, including 4G LTE, 5G, and emerging 6G, Bluetooth (BT) communication protocols, Narrowband Internet of Things (NB-IoT), LoRaWAN, Message Queuing Telemetry Transport (MQTT), Constrained Application Protocol (CoAP), Quick UDP Internet Connections (QUIC), Web Real-Time Communication (WebRTC), Z-Wave, and Matter, and Zero Trust security overlay protocols.

Figure 2:
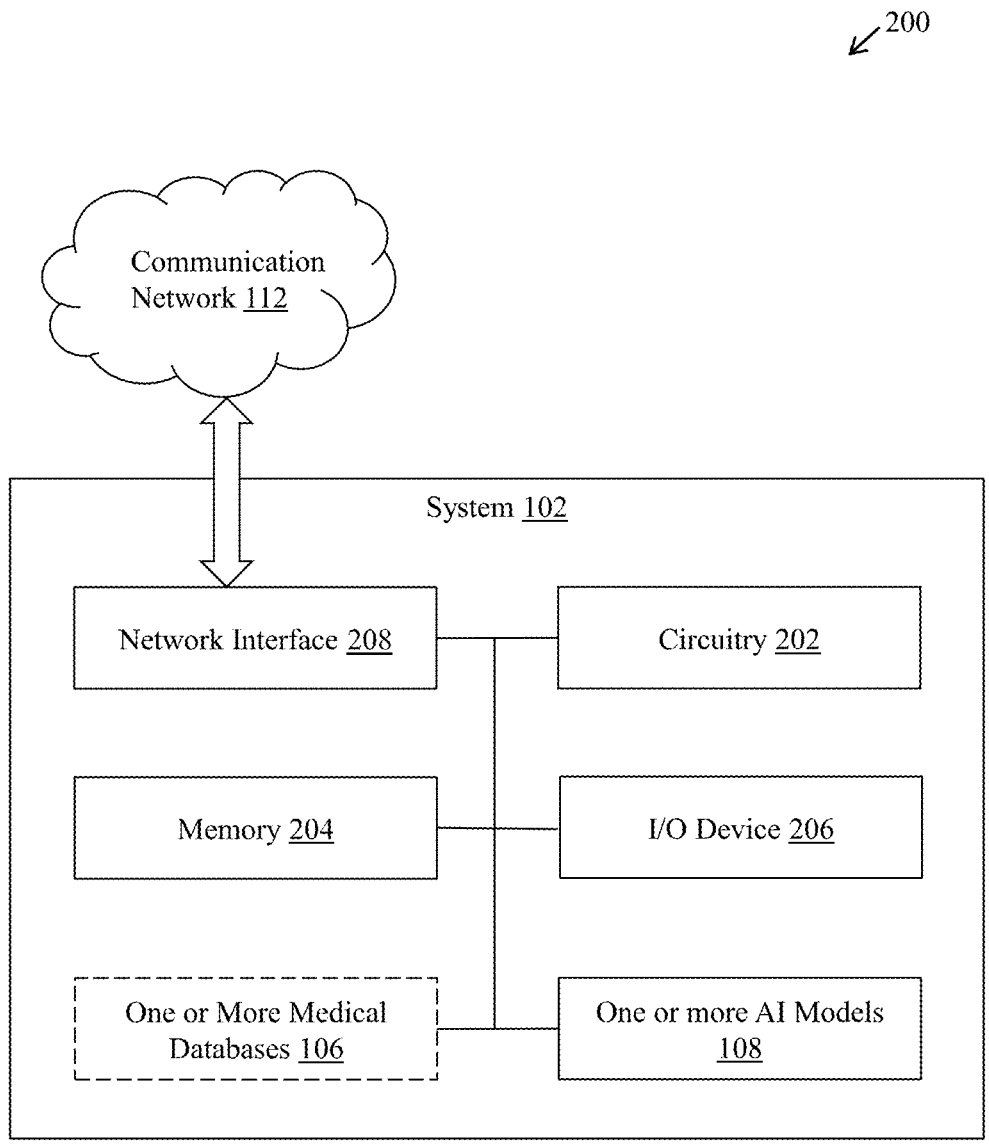
FIG. 2 is a block diagram that illustrates an exemplary intravenous pole for the governance-compliant clinical communication, in accordance with an exemplary embodiment of the disclosure.

FIG. 2 is a block diagram that illustrates an exemplary intravenous pole for the governance-compliant clinical communication, in accordance with an exemplary embodiment of the disclosure. FIG. 2 is explained in conjunction with elements from FIG. 1. With reference to FIG. 2, there is shown a block diagram 200 of the IV pole 102. The IV pole 102 may include a circuitry 202, a memory 204, an input/output (I/O) device 206, a network interface 208, one or more AI models 108, and the one or more medical databases 106. The circuitry 202 may be communicatively coupled to the memory 204, the I/O device 206, the network interface 208, the one or more AI models 108, and the one or more medical databases 106.

The circuitry 202 may include suitable logic, circuitry, and interfaces that may be configured to execute program instructions associated with different operations to be executed by the IV pole 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, ARM-based processors, RISC-V processors, a Graphics Processing Unit (GPU), Neural Processing Units (NPUs), Tensor Processing Units (TPUs), a Reduced Instruction Set Computing (RISC) processor, an Application-Specific Integrated Circuit (ASIC) processor, a Complex Instruction Set Computing (CISC) processor, a microcontroller, Edge AI modules, a central processing unit (CPU), and/or other computing circuits.

The memory 204 may include suitable logic, circuitry, interfaces, and/or code that may be configured to store the program instructions to be executed by the circuitry 202. In at least one embodiment, the memory 204 may store the patient data, one or more EHRs, and medical data. In an embodiment, the memory 204 may be further configured to store one or more encryption techniques, location data, and the like. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive one or more user inputs and provide an output. For example, the IV pole 102 may receive the user input via the I/O device 206. The I/O device 206 may further display the generated one or more alerts. The I/O device 206 which includes various input and output devices, may be configured to communicate with the circuitry 202. Examples of the I/O device 206 may include, but are not limited to, a set of visual indicators, an image capture sensor, a touch screen, a keyboard, a mouse, a joystick, a microphone, a display device 206A, and a speaker.

The network interface 208 may include suitable logic, circuitry, and interfaces that may be configured to facilitate a communication between the circuitry 202, the one or more data sources 104, the one or more medical databases 106, and the server 110, via the communication network 112. The network interface 208 may be implemented by use of various known technologies to support wired or wireless communication of the IV pole 102 with the communication network 112. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G, emerging 6G standards, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n, IEEE 802.11ac, IEEE 802.11ax (Wi-Fi 6/6E)), voice over Internet Protocol (VOIP), light fidelity (Li-Fi), Worldwide Interoperability for Microwave Access (Wi-MAX), Narrowband Internet of Things (NB-IoT), LoRaWAN, Message Queuing Telemetry Transport (MQTT), Constrained Application Protocol (CoAP), Quick UDP Internet Connections (QUIC), Web Real-Time Communication (WebRTC), Z-Wave, Matter, a protocol for email, instant messaging, a Short Message Service (SMS), and Zero Trust security overlay protocols.

In an embodiment, at least one AI model of the one or more AI models 108 may correspond to a sophisticated artificial intelligence (AI) system trained on vast amounts of text data, capable of understanding, generating, and processing human-like language at an extensive scale. The at least one AI model utilizes deep learning techniques, particularly transformer architectures, enabling them to grasp context, syntax, semantics, and even nuances in language usage. The primary function of the at least one AI model may involve, but is not limited to, natural language processing tasks like text generation, translation, summarization, and sentiment analysis. The at least one AI model may learn to predict and generate text by analyzing patterns and relationships within the massive corpus of text they've been trained on. Examples of different types of the at least one AI model may include, but are not limited to, a Transformer-Based Model, a Bidirectional Encoder Representations from Transformers (BERT) model, a Generative Pre-trained Transformer (GPT) model, a Unified Language Model, and a Text-to-Text Transfer Transformer (T5) model, Monolithic LLMs, Mixture of Experts (MoE) Models, Agentic LLMs, Retrieval-Augmented Generation (RAG) Models, Tool-Using LLMs (including function-calling and plugins), Multimodal LLMs, Modular or Compositional LLM Architectures, Distributed and Federated LLMs.

Figure 3:
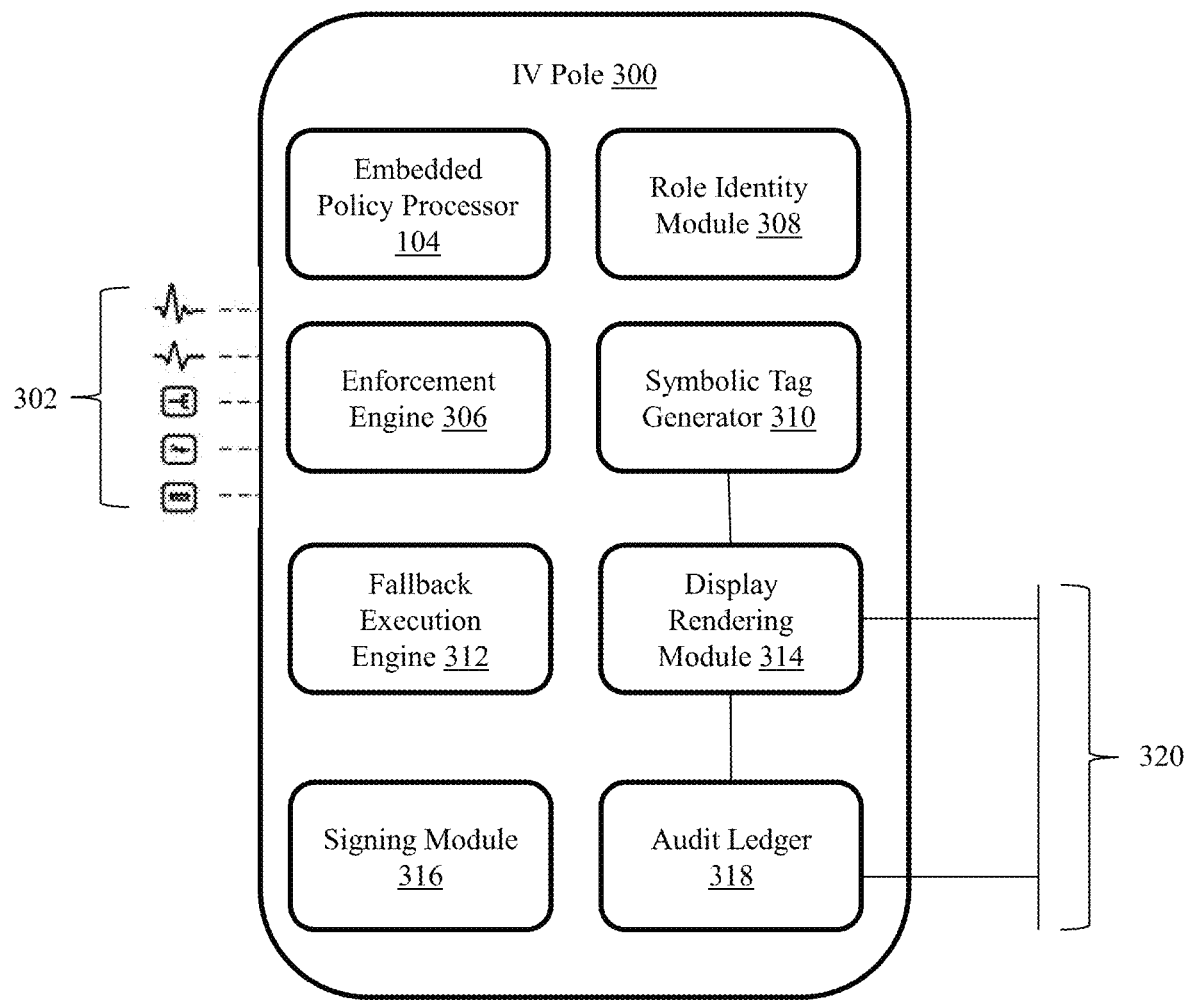
FIG. 3 illustrates an architecture of an AI-ready IV pole system configured for lawful, role-aware telemetry classification and audit logging, in accordance with an exemplary embodiment of the disclosure.

FIG. 3 illustrates an architecture of an AI-ready IV pole system configured for lawful, role-aware telemetry classification and audit logging, in accordance with an exemplary embodiment of the disclosure. With reference to FIG. 3, there is shown an IV pole 300 that includes telemetry acquisition ports 302, an embedded policy processor 304, an enforcement engine 306, a role identity module 308, a symbolic tag generator 310, a fallback execution engine 312, a display rendering module 314, a signing module 316, an audit ledger 318, and a network interface 320. The IV pole 300 may be an exemplary embodiment of the IV pole 102 of FIG. 1 and the network interface 320 may be an exemplary embodiment of the network interface 208 of FIG. 2.

In an embodiment, the AI-ready IV pole 300 includes a fixed housing installed bedside or wall-mounted within a clinical environment (such as a hospital). The pole 100 includes telemetry acquisition ports 302, which interface with clinical devices (also referred as the one or more data sources 104) such as ECG monitors, infusion pumps, pulse oximeters, and ambient sensors. The telemetry acquisition ports 302 of the IV pole 302 may acquire the multimodal physiological telemetry data in real time from the clinical devices. The IV pole 300 may route the acquired telemetry data to the embedded policy processor 304. The embedded policy processor 304 may be a a dedicated CPU or SOC optimized for policy-bound classification. The embedded policy processor 304 may be configured to execute institutional Medical Device Governance (MDG) policies via an MDG policy enforcement engine 306. This embedded policy processor 304 executes machine-level MDG policy grammars through the MDG policy enforcement engine 306, which evaluates logical branches in real-time based on configured policies. In an embodiment, the embedded policy processor 304 applies hierarchical or nested policies, allowing for hospital-wide standards and dynamic departmental customizations, thereby ensuring compliance with regulatory mandates such as the FDA CFR and ONC guidance.

In an embodiment, the role identity module 308 interfaces with one or more user authentication systems to determine the clinical user's role and associated access permissions. Such information governs policy scope and filtering of alerts. The role identity module 308 may retrieve badge swipes, active user credentials, assigned roles, and location-based permissions to enforce personalized policy filters. The telemetry and associated contextual information are then processed by the symbolic tag generator 310. The processing by the symbolic tag generator 310 may include mapping raw numeric data into symbolic alert tags drawn from preconfigured vocabularies or dynamically learned tag sets. Examples of symbolic tags include "tachycardia-alert," "hypoxia-warning," or "flow obstruction detected," which correspond to underlying physiological conditions identified in telemetry data.

To ensure uninterrupted operation during network or inference engine outages, the IV pole 300 may further includes the fallback execution engine 312. The fallback execution engine 312 may employ cached MDG policies and symbolic co-occurrence grammars to synthesize lawful classifications locally, supporting continuity in alert generation even in degraded connectivity scenarios.

In an embodiment, the alerts and/or classifications are communicated to clinical users through the display rendering module 314, which renders role-specific visual or auditory alerts. The display rendering module 314 selectively filters alerts in accordance with the role identity module 308, thereby ensuring compliance with access control policies. In an embodiment, each classification event is cryptographically signed by a signing module 316. The signing of the signing module 316 may correspond to embedding tamper-evident metadata including timestamps, symbolic tags, policy identifiers, and role permissions in the corresponding classification event. The signed data is stored in a secure audit ledger memory 318, providing immutable and traceable forensic records of all telemetry classifications and alerts. In an embodiment, the network interface controller 320 manages secure bidirectional communication between the IV pole 300 and external systems, including AI inference engines, audit servers, and policy management platforms, edge-to-cloud services, hybrid-cloud environments, fog computing nodes, and serverless edge architectures.

In operation, the telemetry acquisition ports 302 receive continuous clinical data streams from connected devices and transmit the raw telemetry to the embedded policy processor 304. The embedded policy processor 304 executes MDG policies loaded into the enforcement engine 306, which applies hierarchical rule sets customized by hospital-wide or unit-specific configurations. The role identity module 308 authenticates the clinician operating or monitoring the IV pole 300, defining the permissions and filters to apply in subsequent classification and alert rendering. The symbolic tag generator 310 interprets the numeric telemetry in the context of active policies and role permissions, assigning semantic tags to significant clinical events. For example, heart rate exceeding 140 bpm is tagged as "tachycardia-alert". In case of network or inference service loss, the fallback execution engine 312 automatically activates, utilizing cached policies and historical co-occurrence grammars to maintain lawful alert classifications without external dependencies. The classified alerts are forwarded to the display rendering module 314, which outputs tailored alerts visually or auditorily, filtered by user role.

The cryptographic signing module 316 signs the alert data, and the audit ledger memory 318 records these signed classification events for compliance and forensic auditing. The network interface controller 320 transmits signed alerts and audit records to centralized systems and receives policy updates or firmware patches as necessary.

For instance, when a pulse oximeter connected to at least one port of the telemetry acquisition ports 302 detects a drop in oxygen saturation of the patient below 88%, the embedded policy processor 304 applies MDG policies through the enforcement engine 306. The role identity module 308 identifies the attending nurse, whose permissions allow alert visibility. The symbolic tag generator 310 maps the event as "hypoxia-warning". If network connectivity is unavailable, fallback engine 312 classifies the event locally. The display module 314 generates a color-coded alert on the nurse's console. The signing module 316 records a tamper-proof signature, and the audit ledger 318 logs the event. Finally, when connectivity resumes, the network interface 320 syncs the data to hospital audit servers.

In various embodiments, the smart IV pole 300 system operates as an AI-ready edge device. The smart IV pole 300 captures structured, time-synchronized physiologic and infusion-related data from attached medical devices via the telemetry acquisition ports 302. The smart IV pole 300 system further validates this time-synchronized physiologic and infusion-related data and tags the time-synchronized physiologic and infusion-related data with patient and device context, thereby forming an AI-compatible telemetry stream.

In some embodiments, the smart IV pole 300 system may include a lightweight, local inference engine that may be capable of executing heuristic-based rulesets—for example, detecting an infusion rate outside prescribed parameters or a disconnect in ventilator. These local inferences may trigger alerts, logs, or visual warnings at the point of care.

In more complex configurations, the IV pole 300 transmits the telemetry stream to a backend Medical Data Governance (MDG) system. The MDG platform, as defined in U.S. Pat. No. 12,001,464, performs higher-order inference using large language models (LLMs), clinical agent frameworks, or other reasoning systems. These MDG-based engines can evaluate data across temporal windows, correlate multi-device inputs, and generate actionable clinical recommendations.

Accordingly, the smart IV pole 300 supports both local and distributed inference architectures, enabling scalable, interoperable AI workflows across diverse clinical environments.

Figure 4:
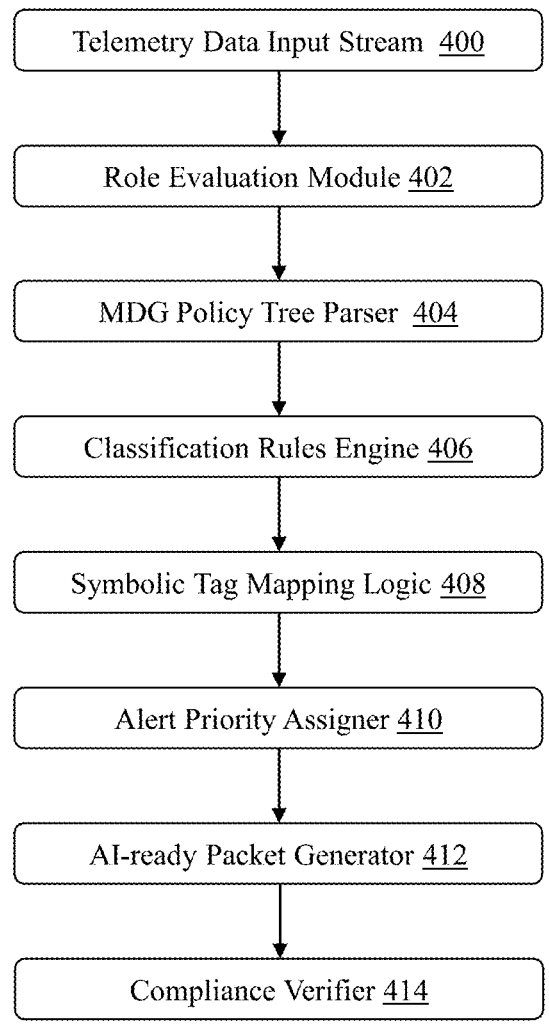
FIG. 4 illustrates an embodiment of the Medical Device Governance (MDG) policy execution and classification logic module of the AI-ready IV pole system, configured to structure incoming clinical telemetry data into lawful alert categories, in accordance with an exemplary embodiment of the disclosure.

FIG. 4 illustrates an embodiment of the Medical Device Governance (MDG) policy execution and classification logic module of the AI-ready IV pole system, configured to structure incoming clinical telemetry data into lawful alert categories, in accordance with an exemplary embodiment of the disclosure. FIG. 4 is explained in conjunction with elements of FIG. 1, FIG. 2, and FIG. 3. With reference to FIG. 4, the module includes a telemetry data input stream 400, a role evaluation module 402, an MDG policy tree parser 404, a classification rules engine 406, a symbolic tag mapping logic 408, an alert priority assigner 410, an AI-ready packet generator 412, and a compliance verifier 414.

In an embodiment, the telemetry data input stream 400 continuously receives real-time clinical data from the telemetry acquisition ports 302 of the IV pole 300 (as shown in FIG. 3). The role evaluation module 402 authenticates and identifies the clinical user based on credentials and environmental context, thus defining the applicable permission scope for the incoming clinical data. The MDG policy tree parser 404 loads hierarchical or nested policy structures, allowing hospital-wide standard rules alongside dynamically customized departmental or unit-level policies. This modular policy architecture ensures flexibility and compliance with regulatory requirements such as FDA CFR and ONC mandates.

The classification rules engine 406 processes the telemetry data in accordance with the loaded MDG policies. Specifically, the classification rules engine 406 applies logical decision branches to categorize clinical events, leveraging symbolic tag mapping logic 408 to convert numeric telemetry signals into semantic alert tags. Such semantic alert tags may be preconfigured, for example "tachycardia-alert" or "hypoxia-warning," or dynamically learned based on historical telemetry patterns and institutional vocabularies. The alert priority assigner 410 evaluates and ranks alerts based on clinical urgency and role-specific visibility rules, ensuring that the most critical alerts are promptly flagged for clinical attention.

The AI-ready packet generator 412 constructs structured data packets that includes timestamped telemetry vectors, role-permission tokens, symbolic alert tags, and policy identifiers. Such structured data packets serve as standardized inputs for downstream artificial intelligence agents, facilitating lawful and explainable AI processing. The compliance verifier 414 ensures that generated packets conform to institutional and regulatory policies prior to transmission.

The telemetry data 400 received from connected medical devices is first contextualized by role evaluation module 402 based on user (medical professional) identity and environment to apply user-specific access controls. The policy tree parser 404 loads the appropriate MDG ruleset-such as a hospital-wide cardiac monitoring standard augmented by unit-specific modifications for the ICU. The classification rules engine 406 applies these policies to identify clinical events; for example, a heart rate exceeding 140 bpm triggers evaluation against the tachycardia threshold rule. The symbolic tag mapping logic 408 converts this event into the semantic tag "tachycardia-alert". The alert priority assigner 410 ranks this as a high-priority alert for critical care nurses, and the AI-ready packet generator 412 formats this event with relevant metadata. The compliance verifier 414 confirms adherence to regulatory policies before forwarding the packet.

For instance, when telemetry data indicates a sudden drop in oxygen saturation below 88%, the IV pole's modules operate collectively to classify the event as a "hypoxia-warning". The role evaluation module 402 identifies the attending clinician's permissions to determine alert visibility. The classification rules engine 406 processes cached MDG policies reflecting hospital-wide respiratory alert thresholds combined with unit-specific protocols. The symbolic tag mapping logic 408 generates the corresponding semantic tag, while the alert priority assigner 410 assigns an urgent status to prompt rapid response. Finally, the AI-ready packet generator 412 packages the event data for transmission to AI analytics engines, and the compliance verifier 414 confirms the packet's regulatory compliance.

Figure 5:
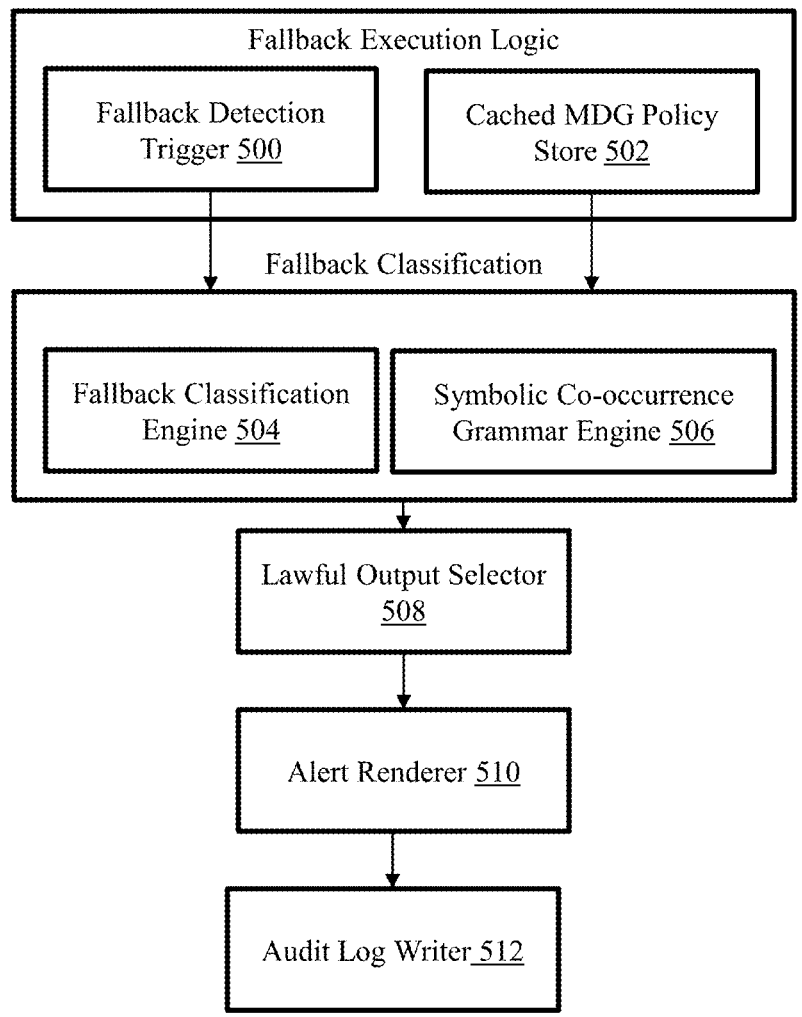
FIG. 5 illustrates an embodiment of the fallback execution engine of the AI-ready IV pole system, configured to maintain lawful classification and alert rendering when external network connectivity or inference engine access is unavailable, in accordance with an embodiment of the disclosure.

FIG. 5 illustrates an embodiment of the fallback execution engine of the AI-ready IV pole system, configured to maintain lawful classification and alert rendering when external network connectivity or inference engine access is unavailable, in accordance with an exemplary embodiment of the disclosure. FIG. 5 is explained in conjunction with elements of FIG. 1, FIG. 2, FIG. 3, and FIG. 4. With reference to FIG. 5, the fallback execution engine includes a fallback detection trigger 500, a cached MDG policy store 502, a fallback classification engine 504, a symbolic co-occurrence grammar engine 506, a lawful output selector 508, an alert renderer 510, and an audit log writer 512.

In an embodiment, the fallback detection trigger 500 monitors connectivity status to external inference engines or policy servers through the network interface 320. Upon detecting latency thresholds or disconnection, the trigger 500 initiates a fallback mode. The cached MDG policy store 502 holds previously validated policy rules and symbolic grammars applicable to the most recent operational context.

The fallback classification engine 504 processes incoming telemetry using cached rules and symbolic models. The symbolic co-occurrence grammar engine 506 assists by mapping signal combinations to known alert conditions derived from historical telemetry and tagging patterns. The lawful output selector 508 verifies whether the proposed classifications remain consistent with cached MDG policies and user role permissions.

The alert renderer 510 displays visual or auditory alerts to authorized clinical users, based on the classification output. The audit log writer 512 generates a signed event record with fallback status and writes the event into the cryptographic audit ledger 318 for future validation.

The fallback detection trigger 500 activates when inference services are offline. The cached MDG policy store 502 provides symbolic grammars to the fallback classification engine 504. The co-occurrence grammar engine 506 evaluates signal clusters, and the lawful output selector 508 validates the classification. The alerts are rendered via module 510 and logged using audit log writer 512. This enables uninterrupted lawful alert generation during outages. For example, if telemetry indicates a rapid heart rate increase combined with reduced SpO$_2$ during a network outage, the fallback logic applies cached policy rules and co-occurrence grammars. The system 102 assigns the tag "hypoxia-tachycardia" via the fallback classification engine 504, renders the alert for ICU staff, and logs the signed event as a fallback-mode classification.

Figure 6:
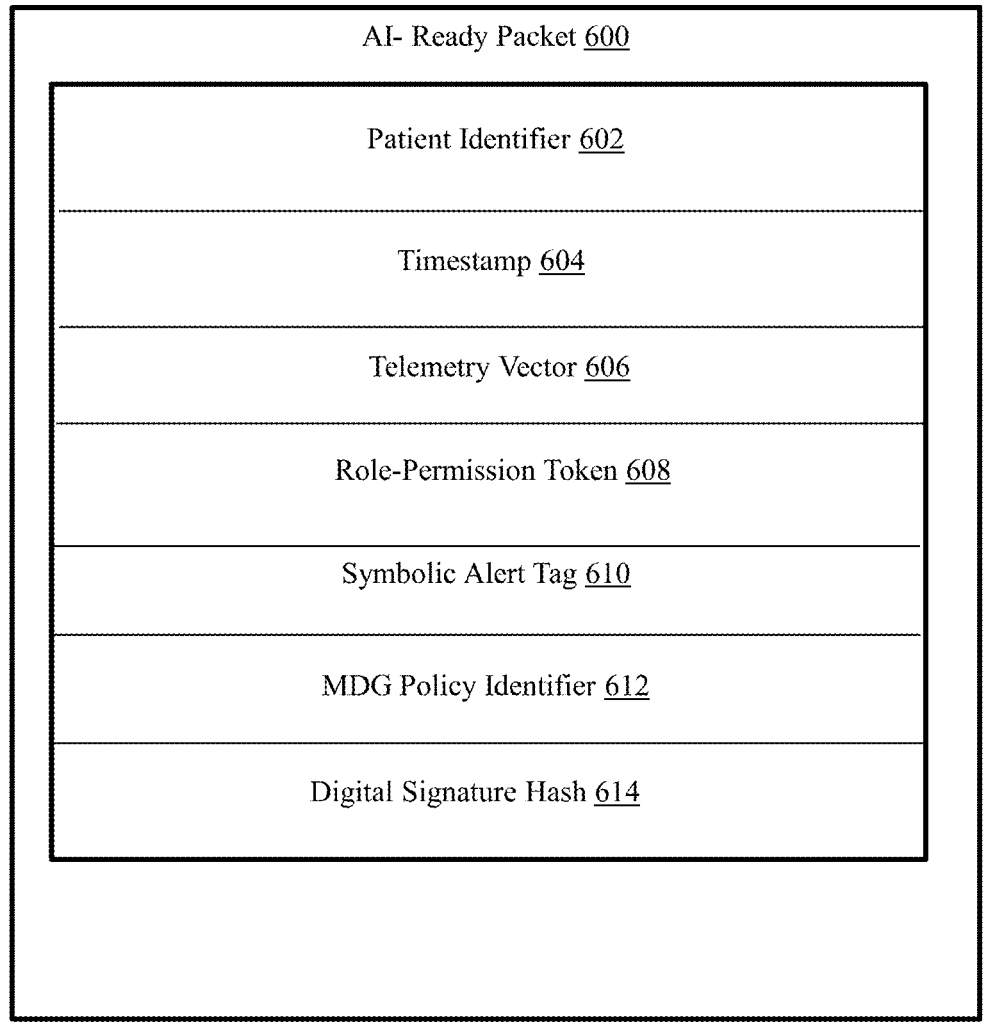
FIG. 6 illustrates an embodiment of the AI-ready packet structure generated by the AI-ready IV pole system, configured to provide structured and lawful telemetry classifications for downstream artificial intelligence systems, in accordance with an exemplary embodiment of the disclosure.

FIG. 6 illustrates an embodiment of the AI-ready packet structure generated by the AI-ready IV pole system, configured to provide structured and lawful telemetry classifications for downstream artificial intelligence systems, in accordance with an exemplary embodiment of the disclosure. FIG. 6 is explained in conjunction with FIG. 1, FIG. 2, FIG. 3, FIG. 4, and FIG. 5. With reference to FIG. 6, the AI-ready packet 600 includes a patient identifier 602, a timestamp 604, a telemetry vector 606, a role-permission token 608, a symbolic alert tag 610, an MDG policy identifier 612, and a digital signature hash 614.

In an embodiment, the patient identifier 602 of the AI-ready packet 600 encodes a de-identified or pseudonymized patient reference. The timestamp 602 of the AI-ready packet 600 records the time of classification or alert event in, for example, Coordinated Universal Time (UTC). The telemetry vector 604 contains structured, machine-readable representations of the physiological data (e.g., heart rate, SpO$_2$, infusion rate) that triggered the classification.

The role-permission token 606 of the AI-ready packet 600 encodes the authorization scope associated with the alert, identifying which clinical roles (e.g., RN, MD) are allowed to view or respond to the alert. The symbolic alert tag 608 of the AI-ready packet 600 represents the semantically classified condition such as "tachycardia-alert" or "over-infusion." The MDG policy identifier 610 of the AI-ready packet 600 provides a unique hash reference to the policy rule responsible for generating the classification. The digital signature hash 612 of the AI-ready packet 600 guarantees data integrity and non-repudiation of the packet contents.

In operation, when a classification is generated, the system constructs the AI-ready packet by compiling relevant data fields. The packet is signed and optionally transmitted to downstream AI systems or decision support engines. This ensures lawful, explainable, and interoperable alert propagation. As an example, if a telemetry stream indicates bradycardia, the system generates the tag "bradycardia-alert," links it to policy ID "MDG_ICU_v14," includes timestamp, telemetry vector, and role token, then signs the packet with a cryptographic hash before transmitting it to the AI system or storing it locally.

Figure 7:
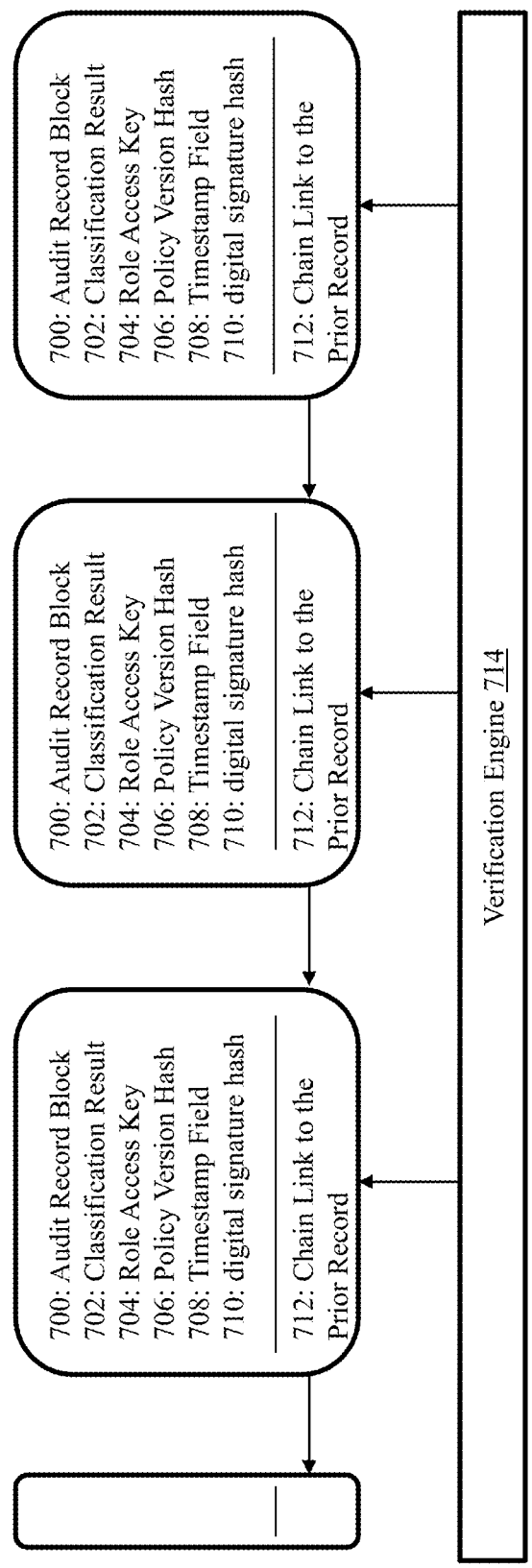
FIG. 7 illustrates an embodiment of the cryptographic audit ledger module of the AI-ready IV pole system, configured to maintain a tamper-evident chain of classification events, in accordance with an exemplary embodiment of the disclosure.

FIG. 7 illustrates an embodiment of the cryptographic audit ledger module of the AI-ready IV pole system, configured to maintain a tamper-evident chain of classification events, in accordance with an exemplary embodiment of the disclosure. FIG. 7 is explained in conjunction with FIG. 1, FIG. 2, FIG. 3, FIG. 4, FIG. 5, and FIG. 6. With reference to FIG. 7, the ledger structure includes an audit record block 700, a classification result 702, a role access key 704, a policy version hash 706, a timestamp field 708, a digital signature hash 710, a chain link to the prior record 712, and a verification engine 714.

In an embodiment, each audit record block 700 encapsulates the outputs of a classification or alert event. The classification result 702 represents the symbolic tag assigned, such as "hypoxia-warning." The role access key 704 records which clinical roles were authorized to receive the alert. The policy version hash 706 identifies the exact version of the MDG rule used in the classification decision.

The timestamp field 708 records the time of classification, while the digital signature hash 710 ensures the entry cannot be modified without detection. The chain link 712 cryptographically connects each record to its predecessor, forming an immutable event chain. The verification engine 714 can validate ledger integrity by recomputing hash values and confirming that no intermediate blocks have been altered.

In an embodiment, every classification or alert rendered by the IV pole 100 is logged as an audit record. Each record is cryptographically signed and appended to the ledger. The system may operate in standalone mode or sync audit entries with centralized systems via network interface 320. The ledger satisfies traceability and auditability requirements under FDA and ONC frameworks. For example, a "flow-obstruction" alert generated for an infusion event is recorded as block 700 with relevant role key, policy hash, timestamp, and signature. This entry is linked to the previous audit block using chain logic. Later, the verification engine 714 confirms integrity of the ledger chain, demonstrating that the alert history is tamper-evident and audit-ready.

Figure 8:
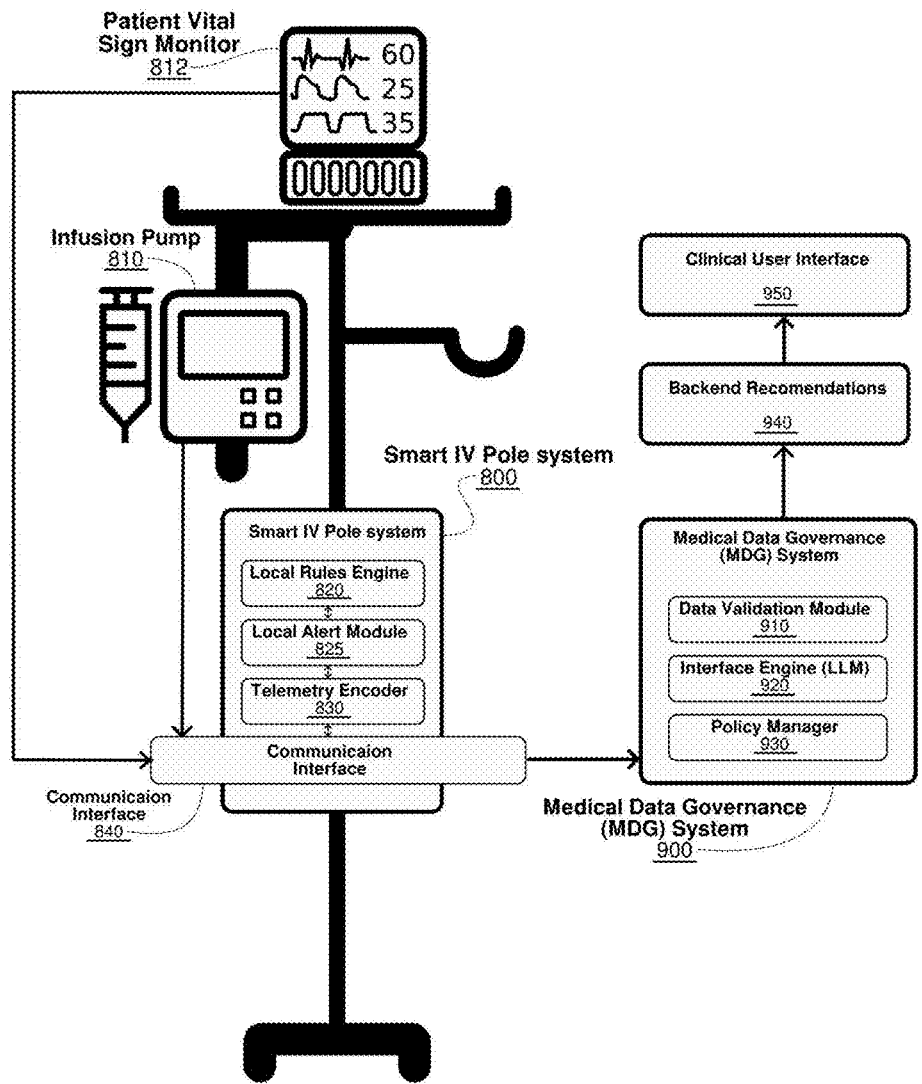
FIG. 8 illustrates an embodiment of the smart IV pole system functioning as an AI-ready edge device, configured to acquire, structure, and transmit patient telemetry for downstream processing, in accordance with an exemplary embodiment of the disclosure.

FIG. 8 illustrates an embodiment of the smart IV pole system functioning as an AI-ready edge device, configured to acquire, structure, and transmit patient telemetry for downstream processing, in accordance with an exemplary embodiment of the disclosure. FIG. 8 is explained in conjunction with FIG. 1, FIG. 2, FIG. 3, FIG. 4, FIG. 5, FIG. 6, and FIG. 7. With reference to FIG. 8, the system includes a smart IV pole 800, an infusion pump 810, a patient vital sign monitor 812, a local rules engine 820, a local alert module 825, a telemetry encoder 830, a communication interface 840, a structured telemetry data stream 850, a remote Medical Data Governance (MDG) system 900, a data validation and synchronization module 910, an inference engine 920, a policy manager 930, a backend alert/recommendation module 940, and a clinical user interface 950.

In an embodiment, the smart IV pole 800 is configured to receive physiological telemetry from connected devices such as an infusion pump 810 and a patient vital sign monitor 812. This telemetry is processed locally in real time by a local rules engine 820, which applies preloaded or cached MDG policy rules to detect threshold violations or abnormal trends. When deviations are detected, the system triggers alerts using a local alert module 825, which may include visual, auditory, or haptic notifications delivered at the bedside.

Concurrently, the telemetry data is passed to a telemetry encoder 830, which structures the incoming data into a standardized, machine-readable format that complies with AI-readiness criteria. The structured telemetry is transmitted via the communication interface 840 as a structured telemetry data stream 850 to a remote Medical Data Governance (MDG) system 900.

The remote MDG system 900 performs additional processing on the received telemetry. A data validation and synchronization module 910 ensures that the incoming data stream is temporally aligned and authenticated. The inference engine 920 implemented, for example, as a large language model (LLM) or a rules-based classification system performs further semantic classification of the telemetry. The results are filtered through a policy manager 930 to ensure that downstream recommendations adhere to role-based permissions and institutional protocols.

The backend-generated recommendations or alerts 940 are produced based on the inference outcome and policy evaluation. These alerts are rendered on a clinical user interface 950 accessible to authorized personnel based on their clinical role and unit assignment.

As an example, when the infusion pump 810 reports an occlusion event, the local rules engine 820 flags the deviation, and the local alert module 825 displays a bedside warning. Simultaneously, the telemetry encoder 830 structures the data, and the communication interface 840 transmits the packet to the MDG system 900. The inference engine 920 confirms the event, and the policy manager 930 validates rendering eligibility. Before an alert is issued, the event packet is subjected to cryptographic verification to ensure data integrity, consistent with the policy validation framework. An alert is sent to the clinical user interface 950 for the attending medical professional for further actions, and the entire sequence, including validation artifacts and alert status, is recorded in the policy audit log 970 to support traceability and compliance.

Figure 9:
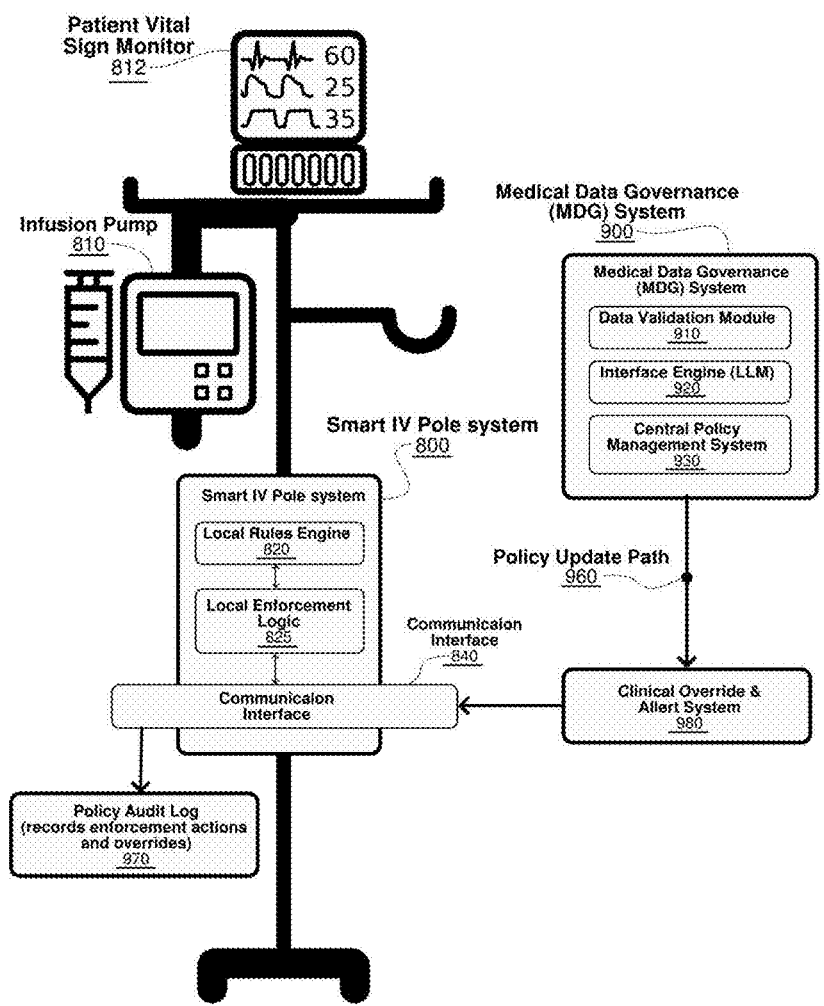
FIG. 9 illustrates an embodiment of a distributed policy enforcement framework in which both edge and backend systems cooperatively apply and update clinical governance protocols, in accordance with an exemplary embodiment of the disclosure.

FIG. 9 illustrates an embodiment of a distributed policy enforcement framework in which both edge and backend systems cooperatively apply and update clinical governance protocols, in accordance with an exemplary embodiment of the disclosure. FIG. 9 is explained in conjunction with FIG. 1, FIG. 2, FIG. 3, FIG. 4, FIG. 5, FIG. 6, FIG. 7, and FIG. 8. With reference to FIG. 9, the system includes a smart IV pole 800, a local rules engine 820, a local enforcement logic module 825, a communication interface 840, a Medical Data Governance (MDG) system 900, a central policy management system 930, a policy update transmission path 960, a policy audit log 970, and a clinical override and alert system 980.

In an embodiment, the smart IV pole 800 operates as an edge enforcement node. The local rules engine 820 and local enforcement logic 825 are configured to evaluate infusion telemetry and patient parameters in real time using institution-defined MDG policy trees. These modules independently apply rules governing dosage, alert thresholds, and alert delivery conditions.

The communication interface 840 is configured to securely receive policy updates transmitted from the central policy management system 930 within the Medical Device Governance system 900. The policy updates are conveyed via a secure policy update transmission path 960, which ensures cryptographic integrity and access control during policy propagation. The received policy updates are validated using methods such as cryptographic checksums, digital signatures, or blockchain-based confirmation mechanisms to ensure authenticity and integrity before implementation.

In an embodiment, enforcement actions, including accepted policy updates, rendered alerts, and clinician overrides, are recorded in a policy audit log 970 stored either locally on the pole or synchronized to the remote audit system. Each logged policy update includes a validation record referencing the cryptographic or blockchain confirmation used during transmission, ensuring traceability and non-repudiation. When a clinical deviation occurs that requires escalation or override, the clinical override and alert system 980 is activated to notify appropriate personnel, such as attending physicians or rapid response teams.

In combination, FIGS. 8 and 9 demonstrate how the smart IV pole system enables both autonomous edge decision-making and synchronized policy governance through a hybrid, distributed architecture suitable for AI-regulated hospital environments, leveraging the edge-cloud continuum, distributed ledger technology (DLT), blockchain-based audit verification, and federated AI learning models.

It is noted that, in various embodiments, the smart IV pole system is not configured to perform general-purpose artificial intelligence (AI) inference locally. Rather, the smart IV pole system is configured to acquire, structure, validate, and transmit clinical telemetry data in a manner that renders the data compatible with downstream AI processing systems.

In certain embodiments, the smart IV pole system operates as an AI-ready edge device. The system prepares clinical data in real time by encoding telemetry signals, applying symbolic metadata, and formatting the resulting information into structured data packets. These packets are configured to comply with Medical Data Governance (MDG) policy constraints and to support lawful ingestion by backend systems that may include inference engines, large language models (LLMs), or other artificial intelligence components.

The structured telemetry stream generated by the IV pole system is therefore inference-enabling, in that it facilitates AI processing and decision support by remote systems. However, the smart IV pole system itself does not execute inference models or machine learning algorithms in the general-purpose sense. Instead, it performs policy-constrained pre-processing and packetization to ensure that all clinical data transmitted downstream is lawful, explainable, and AI-compatible.

As such, the functionality described herein should not be construed as claiming on-device general-purpose AI execution. Rather, the scope of the disclosure encompasses lawful, symbolic, and policy-aware data preparation that enables AI inference at higher tiers of a distributed medical governance infrastructure.

The disclosed system provides a technologically advanced, compliance-aligned infrastructure for the lawful integration of artificial intelligence (AI) within regulated clinical environments. In various embodiments, the system (or the IV pole 300) is configured to acquire, classify, and structure clinical telemetry into semantically enriched and policy-constrained formats. This structured data is further rendered cryptographically auditable, enabling lawful downstream use by AI systems in accordance with emerging regulatory frameworks.

Furthermore, the disclosed system aligns with legal and regulatory requirements, including, but not limited to, the U.S. Food and Drug Administration's (FDA) Good Machine Learning Practice (GMLP), the Structured and Explainable AI for Decision Integrity (SADI) framework, and guidance issued by the Office of the National Coordinator for Health Information Technology (ONC), EU Artificial Intelligence Act (AI Act), Health Insurance Portability and Accountability Act (HIPAA) compliance, and General Data Protection Regulation (GDPR) compliance. By embedding such compliance requirements at the data acquisition layer, the disclosed system reduces institutional exposure to regulatory penalties and mitigates operational risks associated with the deployment of AI in clinical workflows.

In various embodiments, the disclosed system supports ONC guidelines for structured data representation, patient identity attribution, and lawful data exchange. This may also reduce liability under regulatory mandates such as the 21st Century Cures Act's Information Blocking Rule, by ensuring that clinical telemetry and alerts are generated, rendered, and shared in a policy-governed, role-filtered, and audit-traceable manner.

Also, the disclosed system ensures data provenance and traceability. Each classification, alert, or decision event generated by the disclosed system may be digitally signed and immutably recorded in a cryptographically chained audit ledger. Such forensic-quality recordkeeping enhances institutional confidence, supports quality assurance initiatives, and facilitates evidentiary review during regulatory audits or litigation.

In an embodiment, the operational continuity is further enhanced through inclusion of an autonomous fallback execution engine. In certain embodiments, the disclosed system is configured to maintain lawful classification and rendering operations when connectivity to external inference engines or network resources is disrupted. This ensures adherence to institutional policies and continuity of care under adverse conditions, without compromising regulatory compliance.

In terms of privacy and information security, the disclosed system enforces credential-bound role-based filtering, Zero Trust Architecture (ZTA), Secure Access Service Edge (SASE), differential privacy, homomorphic encryption, ensuring that alert outputs and rendered information are accessible only to users authorized by their clinical role, assigned task, or location. This mitigates alert fatigue, reduces the cognitive burden on clinical staff, and limits the exposure of sensitive health data to unauthorized parties.

Furthermore, the disclosed system supports modular integration with existing hospital infrastructure and clinical information systems. The symbolic tagging framework and policy-driven architecture of the disclosed system allows for seamless interoperability across various clinical domains and enable conformance with evolving regulatory standards and diverse AI model platforms. This adaptability supports enterprise-scale deployment in smart hospital environments seeking AI readiness.

The disclosed system is industrially applicable to a wide range of healthcare settings, including but not limited to hospitals, ambulatory surgical centers, outpatient clinics, and other regulated medical facilities. It is particularly suited for deployment in environments where AI-enabled clinical decision support systems are intended to be lawfully introduced, monitored, and governed. By enabling explainable, traceable, and policy-constrained AI data preparation, the system contributes materially to advancements in medical informatics, operational resilience, and patient safety.

As utilized herein, the term "exemplary" means serving as a non-limiting example, instance, or illustration. As utilized herein, the terms "for example," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether the performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for generating a novel molecular structure using a protein structure.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

The invention claimed is:

1. An IV pole system for AI-ready clinical data preparation, comprising:
   at least one data acquisition module integrated into the IV pole and configured to collect physiological telemetry and contextual metadata from a patient environment;
   at least one governance enforcement engine housed within the IV pole and configured to apply a medical data governance policy to the collected data, producing structured symbolic classifications, alert categories, and credential-bound role metadata;
   at least one packetization module integrated into the IV pole and configured to generate semantically structured data packets in an AI-ready format, each of said packets comprising at least one timestamp, symbolic tag, alert classification, role constraint, and policy identifier;
   at least one fallback execution engine integrated into the IV pole and configured to maintain lawful classification and rendering when an external inference engine is unavailable;
   at least one cryptographic module integrated into the IV pole and configured to digitally sign and record each classification result into a tamper-evident audit ledger;
   wherein the structured data packets are is formatted to comply with applicable regulatory standards and is are configured for lawful downstream interpretation by artificial intelligence models.

2. The system of claim 1, wherein the IV pole is configured to be either fixed or mobile, allowing deployment in various patient care environments.

3. The system of claim 1, wherein the symbolic tags include representations of at least one of clinical urgency, classification certainty, and permissible role-based actions, selected from a constrained vocabulary defined by a rendering grammar and mapped to at least one machine-readable or human-interpretable output.

4. The system of claim 1, wherein the fallback execution engine uses symbolic co-occurrence grammars and priority rule-tree traversal to maintain lawful alert rendering in the absence of live inference output.

5. The system of claim 1, wherein rendered outputs are filtered and gated based on clinician role, task authority, and current unit assignment, as defined by the medical data governance policy.

6. The system of claim 1, wherein the audit ledger comprises a cryptographically chained structure that records at least one of patient identity, classification outcome, rendering recipient, timestamp, and digital signature hash for each event, the audit logs being exportable for automated compliance review.

7. The system of claim 1, further comprising a dynamic policy update mechanism integrated into the IV pole and configured to receive, validate, and attest updates to at least one governance ruleset, maintaining cryptographic audit traceability for policy changes, wherein the validation includes use of cryptographic checksums, digital signatures, or blockchain-based confirmation mechanisms to ensure authenticity and integrity of the received updates.

8. The system of claim 1, wherein the data acquisition module is configured to interface with at least one medical device, including infusion pumps, ECG monitors, or pulse oximeters, to collect multimodal telemetry.

9. The system of claim 1, wherein the packetization module generates AI-ready data packets that include role-permission tokens and policy identifiers for downstream AI processing.

10. The system of claim 1, wherein the governance enforcement engine dynamically applies policies based on clinician credentials, location, and task-specific permissions.

11. A method for preparing AI-ready clinical data using an IV pole system, comprising:
    collecting physiological telemetry and contextual metadata from a patient environment using a data acquisition module integrated into the IV pole;
    applying a medical data governance policy to the collected data using a governance enforcement engine housed within the IV pole, producing structured symbolic classifications, alert categories, and credential-bound role metadata;
    generating semantically structured data packets in an AI-ready format, each of said packets comprising at least one timestamp, symbolic tag, alert classification, role constraint, and policy identifier;
    maintaining lawful classification and rendering using a fallback execution engine integrated into the IV pole when an external inference engine is unavailable;
    digitally signing and recording each classification result into a tamper-evident audit ledger using a cryptographic module integrated into the IV pole;
    formatting the structured data packets to comply with applicable regulatory standards and preparing it the structured data packets for lawful downstream interpretation by artificial intelligence models.

12. The method of claim 11, wherein the IV pole is configured to be either fixed or mobile, allowing deployment in various patient care environments.

13. The method of claim 11, further comprising dynamically updating governance policies and applying the updated policies to subsequent data classifications, wherein the updating includes validating the received policy updates using cryptographic checksums, digital signatures, or blockchain-based confirmation mechanisms to ensure authenticity and integrity, and maintaining an auditable trace of the updates for compliance purposes.

14. The method of claim 11, wherein the symbolic classifications include representations of clinical urgency, classification certainty, and permissible role-based actions.

15. The method of claim 11, further comprising filtering and gating rendered outputs based on clinician role, task authority, and current unit assignment.

16. The method of claim 11, further comprising exporting cryptographically signed audit logs for compliance review by external regulatory bodies.

17. The method of claim 11, wherein the fallback execution engine uses symbolic co-occurrence grammars and priority rule-tree traversal to maintain lawful alert rendering in the absence of live inference output.

18. The method of claim 11, further comprising interfacing the data acquisition module with at least one medical device, including infusion pumps, ECG monitors, or pulse oximeters, to collect multimodal telemetry.

19. A computer program product comprising a non-transitory computer-readable medium having instructions stored thereon, which, when executed by a processor integrated into an IV pole system, cause the processor to perform a method for preparing AI-ready clinical data, the method comprising:
    collecting physiological telemetry and contextual metadata from a patient environment using a data acquisition module integrated into the IV pole;
    applying a medical data governance policy to the collected data, producing structured symbolic classifications, alert categories, and credential-bound role metadata;
    generating semantically structured data packets in an AI-ready format, each of said packets comprising at least one timestamp, symbolic tag, alert classification, role constraint, and policy identifier;
    maintaining lawful classification and rendering when an external inference engine is unavailable;
    digitally signing and recording each classification result into a tamper-evident audit ledger; and
    formatting the structured data packets to comply with applicable regulatory standards and preparing the structured data packets for lawful downstream interpretation by artificial intelligence models.

20. The computer program product of claim 19, wherein the instructions further cause the processor to dynamically update governance policies and apply the updated policies to subsequent data classifications.

* * * * *